July 18, 1933. F. L. TITSWORTH 1,918,789
AIR PUMP
Filed Aug. 23, 1929
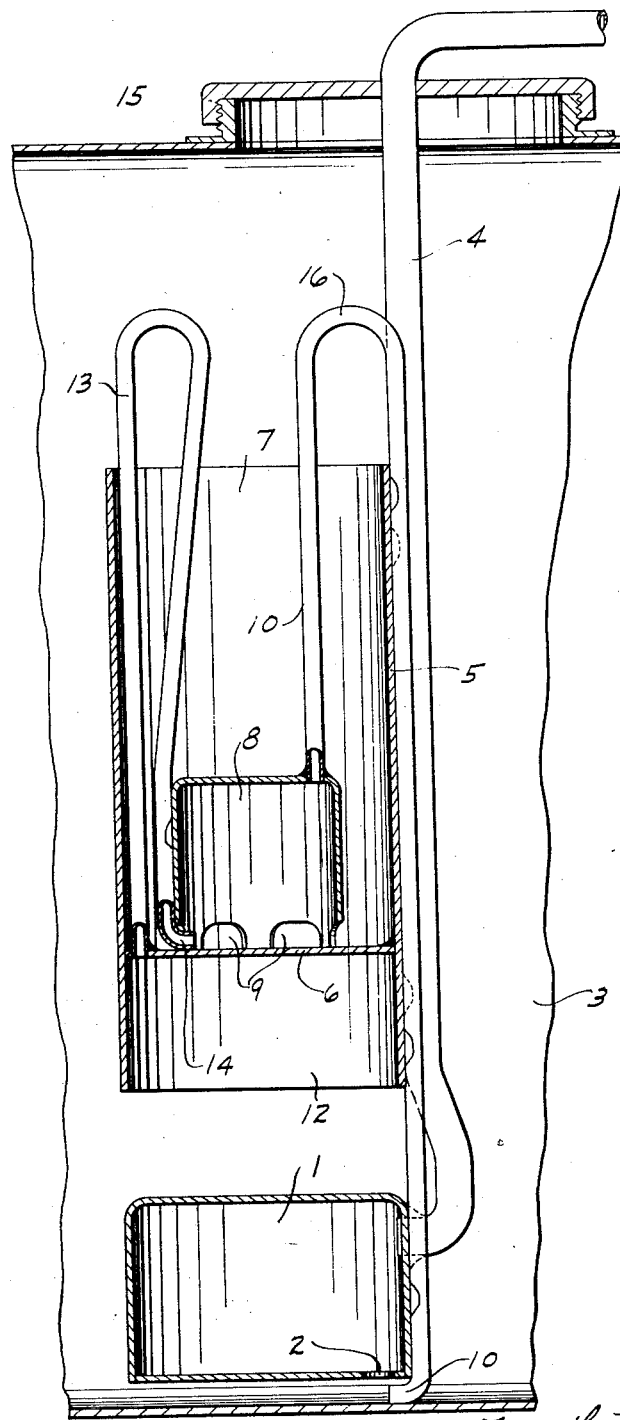
INVENTOR.
Fred L. Titsworth
BY
Wheeler, Wheeler & Wheeler
ATTORNEYS.

Patented July 18, 1933

1,918,789

UNITED STATES PATENT OFFICE

FRED L. TITSWORTH, OF AUBURN, INDIANA, ASSIGNOR TO ALFRED J. KIRSTIN, OF AUBURN, INDIANA

AIR PUMP

Application filed August 23, 1929. Serial No. 387,824.

This invention relates to improvements in air pumps.

It is the primary purpose of the invention to provide a novel and improved form of air pump for restoring air to a hydrostatic gauge system for maintaining a constant datum level therein.

More specifically, it is my purpose to provide an air renewing device capable of handling relatively large quantities of air and operable independently of any means of entraining air with liquid so that the replenishment of the air supply in the hydrostatic gauge system is independent of liquid movement about the submerged bell of the gauge.

It is a very important object of the invention to provide a means which operates automatically to replenish air in a gauge system during the lowering of the liquid levels measured by the gauge. There are numerous air renewing devices previously known which operate only during the filling of the container in which the pressure chamber of the gauge is located. Obviously any disturbance of the datum level during the emptying of the container will leave the gauge inaccurate at the very time when accuracy is required. Other forms of air renewing devices are made to operate by disturbances in the liquid in the container and in such devices the air renewing action is brought about most effectively within a relatively narrow range of liquid depths in the container.

The present device is designed to operate independently of agitation of the liquid within the container and is effective over a wide range of liquid depths, especially at the lower liquid levels in the container, so that the accuracy of the hydrostatic gauge system is maintained at the time when accuracy is most desirable and is substantially independent of liquid agitation which might, in restoring air, incidentally completely destroy the accuracy of the gauge system.

The drawing shows in vertical section an assembly of an air pump or renewing device with the submerged bell of a hydrostatic gauge system, portions of certain communicating tubes being broken away to expose their connections to the various parts of the device.

The primary air bell 1 communicating through an opening 2 with the container 3 in which it is located, comprises the submerged bell of a hydrostatic gauge system. When the container 3 is supplied with liquid, such liquid traps air in the submerged bell 1 under pressure proportional to the depth of the liquid in the container. Such pressure is transmitted in a well known manner through the pipe 4 to a manometer which is calibrated, for gauge purposes, in terms of capacity of the container 3 whereby the amount of liquid in the container is indicated at any given time by the pressure of such liquid upon the air trapped in bell 1.

The present invention deals with a means of replenishing the air in the primary bell 1 when such air is lost through absorption or displacement such as sometimes occurs when liquid agitated in tank 3 penetrates the opening 2 with a surge which results in the discharge of some of the air from bell 1 through such opening.

In accordance with this invention, a tubular barrel 5 is mounted on pipe 4 at an intermediate point or average fuel level. A partition 6 within the barrel 5 defines a well 7 in the upper portion thereof. Within the well 7 is a secondary or air storage bell 8 communicating through apertures 9 with the interior of the well and provided with a duct 10 leading from its upper portion to a point in the tank or container 3 immediately beneath the aperture 2 of the primary barrel 1.

That portion of barrel 5 below the partition 6 comprises a tertiary or air collecting bell 12 from the upper portion of which a duct 13 leads upwardly above the normal level of liquid in container 3 and thence down to a point of discharge at 14 beneath the secondary air bell 8.

The particular mechanical arrangement of parts illustrated in the accompanying drawing is unnecessary to the successful functioning of the device but it is preferred that the parts should be, for the particular purposes of this invention, assembled unitarily not only with each other but with the pipe 4 and the primary air bell 1 of the gauge system in which air is to be replenished to preserve a substantially constant datum level. Since the parts as illustrated are mounted directly upon pipe 4 it is possible to incorporate them into a tank or reservoir unitarily with such pipe, and the single operation of mounting such pipe through cap 15 of tank 3 leaves all of the mechanism in operative position within the tank. The tank 3 may, for purposes of illustration, be assumed to be the fuel tank of a motor vehicle from which pipe 4 leads to the dash of the vehicle upon which the indicating pressure gauge is located and is calibrated to read in gallons, the calibration depending on the capacity of the tank at each successive unit of fuel level therein. The installation of the gauge and its calibration are so well known as not to require illustration.

The operation of the device is as follows, commencing with the condition which exists when the tank 3 is empty.

As the tank is filled, the rising level of liquid therein traps air in the primary bell 1 of the gauge system. Immediately the gauge becomes effective to indicate a figure proportionate to the depth of liquid in the tank and to the consequent hydrostatic pressure upon the air trapped within bell 1.

When the level of liquid reaches the top of barrel 5 it flows into the well 7 and completely fills the well, thereby trapping air within the secondary bell 8 and creating a hydrostatic pressure on the secondary bell which it as least equal to the depth of liquid in well 7.

As liquid in container 3 is gradually consumed and drops below the top of barrel 5, the hydrostatic pressure on the air trapped in bell 8 remains substantially constant since the well 7 will remain filled with liquid except for possible minor losses so negligible that it is ordinarily unnecessary to cover partially the top of chamber or well 7. The hydrostatic pressure in the primary bell 1, however, does not remain constant but is decreasing with the depth of level in the container. Ultimately the hydrostatic pressure in the primary bell 1 will reach a value less than the hydrostatic pressure produced upon the air in the secondary bell 8 by the more or less constant depth of liquid in well 7. As soon as this condition occurs, air flow will occur between the secondary bell 8 and the lower or discharge end of duct 10. The air discharged from such duct will bubble into bell 1 through opening 2 to the full extent required for the replenishment of any losses from bell 1 after which excess air will not be able to enter bell 1 but will bubble upwardly through the tank or container 3.

This displacement of air from secondary bell 8 to primary bell 1 will continue until the level of liquid in well 7 is reduced to a point corresponding with the level of liquid in the tank 3 above the discharge end of tube 10. Such reduction of level of the liquid in well 7 produces a corresponding reduction of hydrostatic head upon the air in bell 8 until the head on the air in bell 8 equals that on the air in bell 1 or, more accurately, equals the head at the discharge end of tube 10.

When the level of liquid in the container 3 drops below the lower end of barrel 5, the tertiary air bell 12 fills with air which becomes trapped therein when the container 3 is again filled with liquid. No siphoning of liquid through tube 13 occurs because no level of liquid in tank 3 can ever expel air from the bend of tube 13 above well 7. As the level of liquid in the container rises, the hydrostatic pressure within the secondary bell 8 remains constant, whereas the hydrostatic pressure within the first and third bells 1 and 12, respectively, increases proportionately to the depth of liquid in the container. The height of the bend 16 in tube 10 prevents any delivery of air or liquid reversely through tube 10 into bell 8. Ultimately, however, the depth of liquid above the third bell 12 becomes greater than the remaining depth of liquid in the well 7 above the second bell 8 and at this time air is delivered through pipe 13 beneath bell 8 to restore its normal hydrostatic head and thereby to displace the liquid which entered bell 8 during air delivery from bell 8 to a point beneath bell 1. Before the fuel level in container 3 reaches the upper margin of the barrel 5 such barrel, barring losses, should again be completely filled with liquid due to the displacement of liquid from chamber 8 by means of air supplied from the third bell 12.

The device is now in condition for a continuous cycle of operation in which each decrease of liquid level in container 3 is accompanied, as the container empties, with a concurrent delivery of air from bell 8 to bell 1 to replenish any losses which may have occurred in the latter. Each filling operation of container 3 is accompanied (providing bell 12 has been uncovered) by a renewal of air in the secondary bell 8 and a consequent restoration of liquid level to the top of well 7. With the device in normal operation the amount of liquid in well 7 will remain substantially constant, serving merely as a trap for the air and a variable pressure head for the two stage operation of the air pump as above described.

Reference has been made above to the necessity of uncovering bell 12 in order to permit the functioning of the device. In actual automotive practice, however, no difficulty is experienced in this connection since it is found that a relatively large volume of air is successfully delivered by the device herein disclosed during normal operation of a vehicle to which such device is applied.

It will be understood that a complete cycle of operation of this device requires one increase and one decrease of liquid level within tank 3, the increasing level serving to charge the secondary air bell 8 and the decreasing level serving to displace the air from bell 8 to a point where it can enter bell 1. It will be noted that, contrary to the usual fact in automatic air renewing devices, this device functions substantially continuously during the lowering of liquid level in tank 3 in the lower stages of liquid in such tank. This is the time at which air renewal is most needed since when the liquid is low in tank 3 its agitation may result in displacing air from the datum level bell 1. It will be noted further that this device does not require agitation of the liquid in tank 3 for its operation. Hence this device is well adapted for use in many instances in which air renews depending upon liquid agitation would fail to function.

It will be noted by those skilled in the art that the amount of air delivered may be varied as required by changing the proportions of the parts. The pressure on bell 8, for instance, depends upon the height of liquid thereabove, whereas the amount of air which can be delivered from bell 8 will depend upon its volumetric capacity with particular reference to its horizontal dimension or diameter. For some purposes, therefore, the air pump herein disclosed may be made very broad with reference to its vertical height and will thus function to deliver relatively large quantities of air in accordance with increasing and decreasing levels in a container.

I claim:

1. An air pump comprising the combination with a container adapted to receive and hold liquid of variable depth, of a first air bell subject to a variable head generally proportional to the depth of liquid in said container, means for supplying air to the first air bell during a cycle of change of depth of the liquid in the container, said means including a secondary bell above the first and provided with a well adapted to contain liquid at relatively constant depth and subjecting air in said second bell to a head sometimes less and sometimes greater than the head upon said first mentioned bell, and a duct arranged for air delivery from an upper portion of said first bell to said second bell and including means for preventing liquid delivery between said bells at the relative heads to which said bells are normally subject.

2. An air pump comprising a container for liquid of variable depth and means in said container comprising a bell adapted at a minimum depth of liquid in said container to be uncovered by said liquid, a second bell provided with a pipe from an upper portion of the first bell for delivering air from the first bell to the second bell, said pipe being provided with means for preventing the return of air delivered, and a well surrounding said second bell above which said pipe extends and which is adapted to maintain air therein subject to a predetermined minimum head with respect to which the head produced upon the air in the first bell by the depth of liquid in said container is sometimes greater and sometimes less.

3. An air pump comprising a device adapted to be immersed in liquid of variable depth and including first and second bells provided with mechanical connecting means supporting them at different levels, a conduit having means for preventing liquid delivery at liquid levels to which said bells are normally subject and including an elevated intermediate portion and communicating at its ends with said bells, its communication with the lower bell being at an upper portion thereof, and a well enclosing the upper bell below said conduit portion and adapted to maintain thereon a head of liquid independent of the variation to which liquid in said container is subject and an air delivery pipe leading from an upper portion of the bell enclosed by said well and provided with unidirectional flow control means.

4. A device for delivering air toward the bottom of a container for liquid subject to variation in level, said device comprising an air collecting bell at a depth in said container such that said bell will be uncovered by the fluctuation of liquid level in said container, an air storage bell, a pipe provided with means ensuring unidirectional delivery and leading from an upper portion of said collecting bell to a point for discharge into said storage bell, means for maintaining air in said storage bell under a head with respect to which the head on said collecting bell is sometimes greater and sometimes less, and a pipe provided with means ensuring unidirectional delivery and leading from an upper portion of said storage bell to the desired point of delivery in said container, said pipes having intermediate portions elevated above a level to which the head maintained by said means is capable of forcing liquid, and the head on said storage bell being so determined with reference to the variation in said head at said point of delivery as to be sometimes greater and sometimes less than the head at the delivery point.

5. A device for delivering air toward the bottom of a container for liquid subject to variation in level, said device comprising an air collecting bell at a depth in said container such that said bell will be uncovered by the fluctuation of liquid level in said container, and an air storage bell, a pipe leading from an upper portion of said collecting bell to a point for discharge into said storage bell, means for maintaining air in said storage bell under a head with respect to which the head on said collecting bell is sometimes greater and sometimes less, and a pipe leading from an upper portion of said storage bell to the desired point of delivery in said container, the head on said storage bell being so determined with reference to the variation in said head at said point of delivery as to be sometimes greater and sometimes less than the head at the delivery point, each of said pipes including means for insuring a uni-directional delivery of air therethrough.

6. A device of the character described, comprising means for trapping air under variable pressure, means for storing air so trapped, means for subjecting the stored air to a pressure sometimes exceeding and sometimes less than the head upon air in said trapping means, a unidirectional flow device connecting said trapping means with said storing means and for delivering air from said trapping means to said storing means, and a uni-directional flow device for the delivery of air from said storing means, including a pipe likewise subject at its discharge end to variation of head to an extent rendering it intermittently subject to less head than the air in said storing means.

7. The combination with a container for liquid subject to variation in level, of a well disposed in said container and providing a predetermined minimum force of liquid pressure, an air bell in said well, a collecting air bell disposed at a point to be uncovered intermittently by liquid in said container for the entrapment of air and at a depth in said container such that liquid at a maximum level therein will create a greater head in said collecting bell than in said first mentioned bell, a pipe affording communication between an upper portion of said collecting bell and having its delivery end submerged in liquid contained in said well and said first mentioned bell, said pipe including a portion above said well and a second pipe leading from an upper portion of said first mentioned bell to a point above the well and thence downwardly toward the bottom of said container.

8. The combination with the datum level establishing bell of a hydrostatic gauge, of a receptacle for liquid in which said bell is disposed adjacent the lowest level of liquid to be measured, and means adapted for operation by the reduction of level of liquid in said container for automatically replenishing air in said bell, said means comprising a collecting bell subject to varying head in accordance with varying liquid levels in said container, a discharge line subject at its discharge end to varying head in accordance with varying liquid levels in said container, and means affording communication between an air containing portion of said collecting bell and the discharge line including an air storage chamber, means for maintaining unidirectional flow of air through said communication means and means for maintaining air in said chamber subject to pressures intermittently less than the head upon air in said collecting bell and intermittently greater than the head upon the discharge end of said line.

9. As a new article of manufacture, a device for delivering air toward the bottom of a container for liquid, operable by variations in level of liquid in said container, and adapted for delivery of air downwardly as the level of liquid in the container falls, said device comprising means for storing air and means for subjecting stored air to predetermined minimum pressure, a collecting mechanism including a delivery duct adapted to deliver air to said storage means and means mechanically connecting said collecting mechanism with said storage means for disposition in a container at a point where air collected thereby will be intermittently subject to greater head of liquid in said container than the pressure on air in said storage means, said storage means having a uni-directional discharge pipe having its delivery end at a predetermined point with reference to said storage means and collector, such that said point will intermittently be subject to less pressure than the pressure upon air in said storage means.

10. A device for delivering air toward the bottom of a container for liquids, adapted for operation by a change of level of liquids in said container and adapted for discharge of air effected by a lowering level of liquid in said container, said device comprising in mechanical connection the combination of a well comprising means for permanently retaining a predetermined minimum head of liquid, a bell in said well adapted to trap air under the head of liquid in said well, a pipe leading from an upper portion of said bell to a point low in said container, said pipe including a portion above said well, and means for supplying air to said bell, said bell being adapted to deliver air through said pipe whenever the head of liquid above the discharge end of said pipe is less than the head of liquid upon the air in said bell.

11. A device for delivering air toward the bottom of a container for liquids adapted for operation by a change of level of liquids in said container and adapted for discharge of air effected by a lowering level of liquid in said container, said device comprising in mechanical connection the combination of a well positioned at an intermediate level to receive a portion of liquid from said container, a bell in said well adapted to trap air under the head of liquid in said well, a pipe leading from an upper portion of said bell to a point low in said container, said pipe including a portion above said well, and means for supplying air to said bell, said bell being adapted to deliver air through said pipe whenever the head of liquid above the discharge end of said pipe is less than the head of liquid upon the air in said bell, said means for supplying air to said bell being operable to trap air at low levels of liquid in such container and to subject such air to a head exceeding the head upon said bell when liquid levels in said container are high.

12. In a device of the character described, the combination with a well, of an air trapping bell mechanically connected to said well and disposed therebeneath, an air storage bell within said well, a pipe affording communication between an upper portion of said trapping bell with a lower portion of said storage bell and disposed to be sealed by liquid in said well, and including an intermediate portion higher than the well and a delivery pipe extending upwardly higher than the well from an upper portion of said storage bell and thence downwardly below said trapping bell.

13. In a device of the character described, the combination with a well, of an air trapping bell mechanically connected to said well and disposed therebeneath, an air storage bell within said well, a pipe affording communication between an upper portion of said trapping bell and a lower portion of said storage bell and disposed to be sealed by liquid in said well and including an intermediate portion higher than the well, and a delivery pipe extending upwardly higher than the well from an upper portion of said storage bell and thence downwardly below said trapping bell, together with the submersible portions of a hydrostatic gauge system with which said well, bells, and pipes, are mechanically connected for unitary mounting and including a datum level bell to which said delivery pipe leads in operative air delivering relation.

14. The combination with the air pipe of a hydrostatic gauge system, of a datum level bell with an upper portion of which said pipe is in communication and to which said pipe is mechanically connected, of a well mounted on an intermediate portion of said pipe above said bell, an air collecting bell disposed intermediate said well and said first mentioned bell, an intermediate bell within said well, and air conduits provided with means including portions disposed above the maximum level of liquid in said well and affording one-way communication for air delivery from said collecting bell to said intermediate bell and thence to a point immediately beneath said datum level bell, the whole being unitarily assembled for air delivery in accordance with relative changes of level of a liquid in which said unitary assembly is disposed.

15. In a device of the character described, the unitary combination of a substantially vertical sleeve provided with a partition intermediate its open ends, an inverted bell disposed within said sleeve immediately above said partition, a pipe communicating with the space within said sleeve below said partition extending to a point above said sleeve and thence back to a point immediately above said partition and having an open end communicating with the space beneath said bell, and a second pipe communicating with the upper portion of said bell and extending to a point above said sleeve and thence downwardly below said sleeve.

16. In a device of the character described, the unitary combination of a substantially vertical sleeve provided with a partition intermediate its open ends, an inverted bell disposed within said sleeve immediately above said partition, a pipe communicating with the space within said sleeve below said partition extending to a point above said sleeve and thence back to a point immediately above said partition and having an open end communicating with the space beneath said bell, and a second pipe communicating with the upper portion of said bell and extending to a point above said sleeve and thence downwardly below said sleeve to a point such that it will normally be submerged when in use, together with a datum level bell disposed immediately below said sleeve and provided with a gauge pressure pipe upon which said sleeve and the aforesaid bell and pipes are mounted.

FRED L. TITSWORTH.